US011613167B2

(12) United States Patent
Ko et al.

(10) Patent No.: US 11,613,167 B2
(45) Date of Patent: Mar. 28, 2023

(54) VEHICULAR AIR CONDITIONING SYSTEM

(71) Applicants: Hanon Systems, Daejeon (KR); SEONDO ELECTRIC CO., LTD., Ansan-si Gyeonggi-do (KR)

(72) Inventors: Jae Woo Ko, Daejeon (KR); Jong Min Lee, Daejeon (KR); Yong Wook Jang, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/761,934

(22) PCT Filed: Nov. 26, 2018

(86) PCT No.: PCT/KR2018/014625
§ 371 (c)(1),
(2) Date: May 6, 2020

(87) PCT Pub. No.: WO2019/107850
PCT Pub. Date: Jun. 6, 2019

(65) Prior Publication Data
US 2020/0324626 A1    Oct. 15, 2020

(30) Foreign Application Priority Data

Nov. 28, 2017  (KR) .................. 10-2017-0160497
Nov. 21, 2018  (KR) .................. 10-2018-0144149

(51) Int. Cl.
*B60H 3/00*    (2006.01)
(52) U.S. Cl.
CPC .................. *B60H 3/0078* (2013.01)
(58) Field of Classification Search
CPC .................. B60H 3/0071; B60H 3/0078
(Continued)

(56) References Cited

U.S. PATENT DOCUMENTS

| 7,749,313 B2* | 7/2010 | Byon ................ B60H 1/3233 96/83 |
| 10,096,977 B2* | 10/2018 | Nishida ................ H01T 23/00 |
| 2010/0175391 A1* | 7/2010 | Jee ................ B60H 3/0071 62/3.1 |

FOREIGN PATENT DOCUMENTS

DE    102008049278 A1 *  4/2010 ............ A61L 9/22
JP        H1076842 A       3/1998
(Continued)

OTHER PUBLICATIONS

Yoon et al., KR 10-1315801 B1 English machine translation, Oct. 8, 2013 (Year: 2013).*

(Continued)

*Primary Examiner* — Allen R. B. Schult
(74) *Attorney, Agent, or Firm* — Norton Rose Fulbright US LLP; James R. Crawford (57) ABSTRACT

A vehicular air conditioning system includes an air-conditioning case having a plurality of passages divided by a partition wall, and an ion generator configured to emit anions and cations into the passages. The ion generator includes a plurality of discharge electrodes installed to extend into the passages of the air-conditioning case and configured to emit anions and cations into the passages. The partition wall of the air-conditioning case includes a communication portion configured to bring the passages into communication with each other so that the discharge electrodes installed in the passages face each other in the same space.

5 Claims, 10 Drawing Sheets

(58) Field of Classification Search
USPC .......................................................... 454/139
See application file for complete search history.

(56) References Cited

FOREIGN PATENT DOCUMENTS

| KR | 101307899 B1 | 9/2013 |
| KR | 101315801 B1 | 10/2013 |
| KR | 101391154 B1 | 5/2014 |
| KR | 101717612 B1 | 3/2017 |

OTHER PUBLICATIONS

Kim et al., KR 10-1307899 B1 English machine translation, Sep. 13, 2013 (Year: 2013).*
International Search Report issued in PCT/KR2018/014625 dated Feb. 25, 2019.

* cited by examiner

VEHICULAR AIR CONDITIONING SYSTEM

This application is a national phase under 35 U.S.C. § 371 of International Application No. PCT/KR2018/014625 filed on Nov. 26, 2018, which claims the benefit of priority from Korean Patent Application Nos. 10-2017-0160497 filed on Nov. 28, 2017, and 10-2018-0144149 filed on Nov. 21, 2018. The entire contents of each of these applications is incorporated herein by reference in its entirety.

TECHNICAL FIELD

The present invention relates to a vehicular air conditioning system and, more particularly, to a vehicular air conditioning system capable of improving an ion generator and an internal structure of an air-conditioning case to uniformly supply a large amount of anions to each passage of the air-conditioning case without any deviation, and consequently enhancing the sterilization and deodorization performance of an evaporator part in each passage to improve an air purification effect in a passenger compartment.

BACKGROUND ART

Recently, a vehicular air conditioning system is equipped with various techniques for improving comfort in a passenger compartment. As an example, there is available a two-layer temperature control technique that independently controls the temperatures of upper and lower parts of the passenger compartment.

Figure 1:
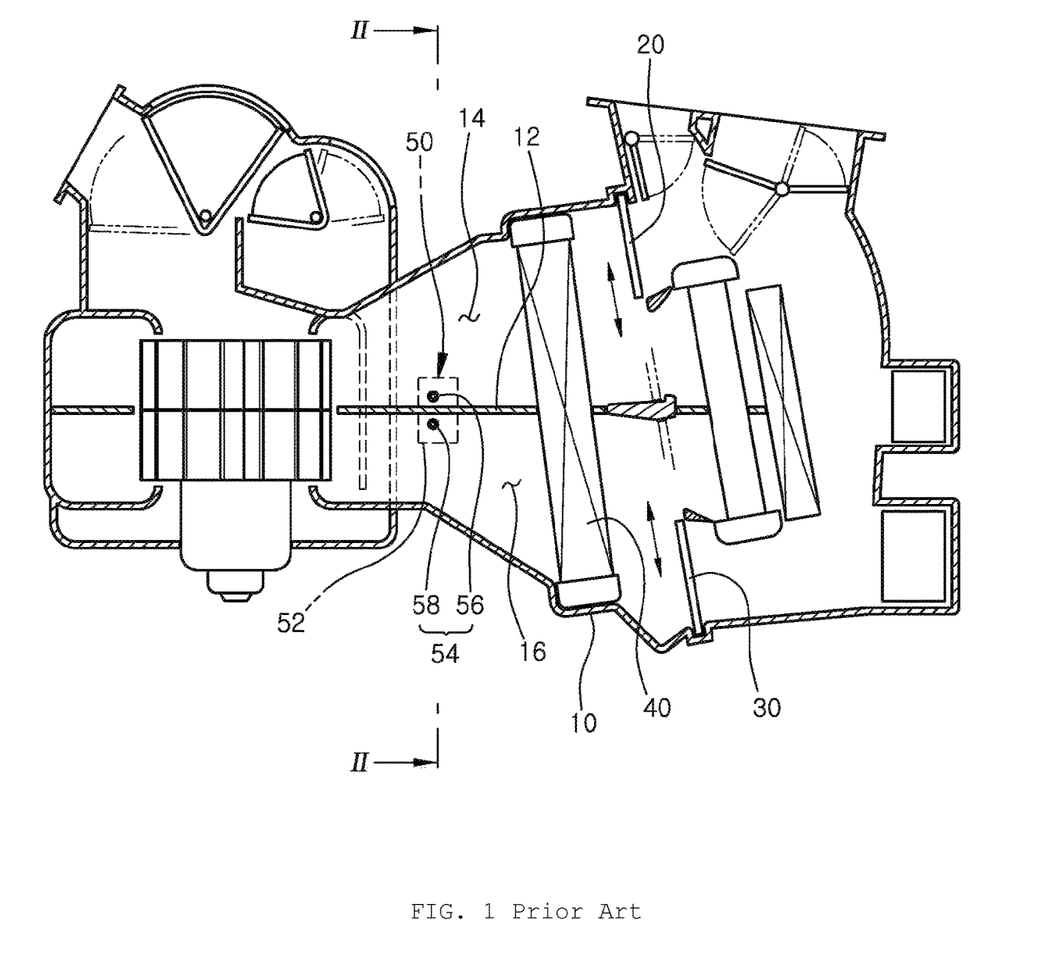
FIG. 1 is a view showing a conventional vehicular air conditioning system.

In the two-layer temperature control technique, as shown in FIG. 1, a partition wall 12 is installed inside an air-conditioning case 10 so as to divide the inside of the air-conditioning case 10 into an upper first passage 14 and a lower second passage 16. Temperature doors 20 and 30 are installed in the first passage 14 and the second passage 16, respectively. Then, the temperature doors 20 and 30 are individually controlled to individually control the flow rates of cold air and hot air flowing through the first passage 14 and the second passage 16.

Then, the flow-rate-controlled cold or hot air in the first passage 14 is supplied to the upper part of a passenger compartment through an air discharge port (not shown), and the flow-rate-controlled cold or hot air in the second passage 16 is supplied to the lower part of the passenger compartment through an air discharge port (not shown). Therefore, the upper and lower parts in the passenger compartment are independently cooled and heated. As a result, the upper and lower parts in the passenger compartment are always cooled and heated in a comfortable state.

Meanwhile, the air conditioning system adopting the two-layer temperature control technique includes an ion generator 50 installed on the upstream side of an evaporator 40.

Figure 2:
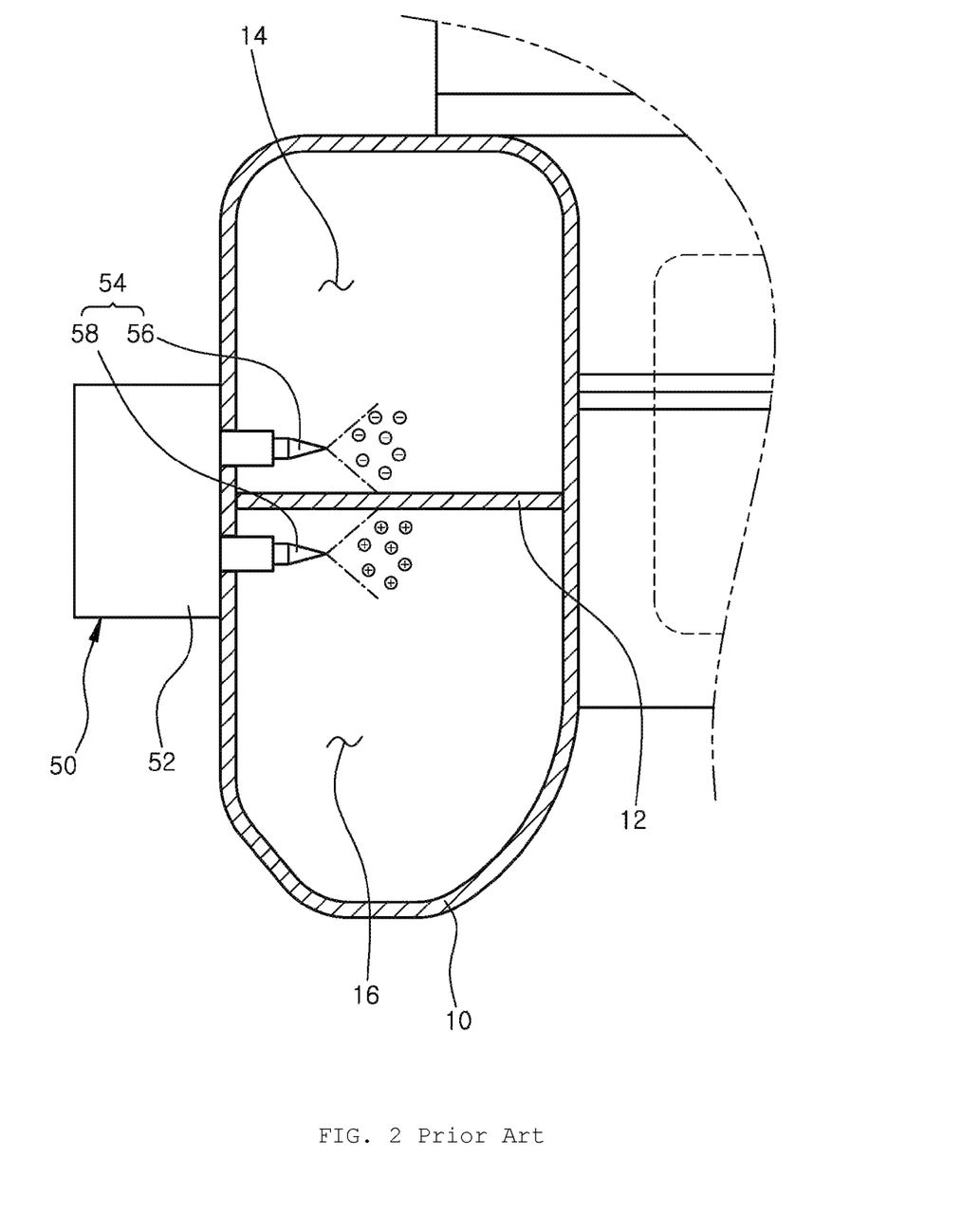
FIG. 2 is a sectional view taken along line II-II in FIG. 1, which shows the conventional vehicular air conditioning system in detail.

As shown in FIG. 2, the ion generator 50 includes a main body 52 installed the air-conditioning case 10, and an ion generation part 54 extending from the body 52 toward the inside of the air-conditioning case 10.

The ion generation part 54 includes an anion discharge electrode 56 and a cation discharge electrode 58. The anion discharge electrode 56 and the cation discharge electrode 58 extend from the main body 52 toward the first passage 14 and the second passage 16 of the air-conditioning case 10. The anion discharge electrode 56 and the cation discharge electrode 58 directly discharge high voltage pulses to the first passage 14 and the second passage 16, respectively, to generate anions and cations.

Therefore, the generated anions and cations are introduced toward the evaporator 40 to sterilize bacteria and fungi inhabiting on the surface of the evaporator 40 and to deodorize odors. This enhances the cleanliness of the air supplied into the passenger compartment.

However, such a conventional vehicular air conditioning system has a configuration in which the anion discharge electrode 56 and the cation discharge electrode 58 of the ion generator 50 are independently installed in the first passage 14 and the second passage 16 with the partition 12 interposed therebetween. Therefore, the conventional vehicular air conditioning system has a disadvantage that anions having excellent sterilization ability are intensively generated only in the first passage 14 where the anion discharge electrode 56 is disposed.

Due to this disadvantage, there is a problem in that the anions are generated in a very small amount or not generated at all on the side of the second passage 16 where the anion discharge electrode 56 is not disposed. Thus, there is a drawback that the sterilization and deodorization performance for the evaporator 40 is deteriorated and the air purification effect in the passenger compartment is significantly reduced.

In addition, the conventional vehicular air conditioning system has a structure in which the anion discharge electrode 56 and the cation discharge electrode 58 of the ion generator 50 are isolated from each other by the partition wall 12 interposed therebetween. Therefore, there is a problem that the amount of anions and cations generated in the anion discharge electrode 56 and the cation discharge electrode 58 is significantly reduced.

In particular, anions are generated in a large amount in the course of the interaction between the high voltage pulses emitted from the anion discharge electrode 56 and the cation discharge electrode 58. However, in the structure in which the anion discharge electrode 56 and the cation discharge electrode 58 are isolated from each other by the partition wall 12 as in the prior art so that the high voltage pulses cannot interact, there is a problem in that the amount of anions is reduced.

Due to this problem, the amount of anions introduced toward the evaporator 40 is reduced, and the sterilization and deodorization performance for the evaporator 40 is reduced. As a result, there is a drawback that the air purification effect in the passenger compartment is significantly reduced.

SUMMARY

In view of the aforementioned problems inherent in the related art, it is an object of the present invention to provide a vehicular air conditioning system capable of improving an ion generator and an internal structure of an air-conditioning case to ensure that a large amount of anions is generated in both a first passage and a second passage of the air-conditioning case regardless of the positions of discharge electrodes.

Another object of the present invention is to provide a vehicular air conditioning system capable of enhancing the sterilization and deodorization performance for an evaporator region of each of a first passage and a second passage of an air-conditioning case without any region-by-region deviation, and consequently improving an air purification effect in a passenger compartment.

A further object of the present invention is to provide a vehicular air conditioning system capable of improving an ion generator and an internal structure of an air-conditioning case to enable electrical interaction between an anion discharge electrode and a cation discharge electrode regardless of a partition wall, thereby significantly increasing the amount of anions and cations generated in the anion discharge electrode and the cation discharge electrode.

A still further object of the present invention is to provide a vehicular air conditioning system capable of supplying a large amount of anions to a downstream side evaporator region on the downstream side, and consequently enhancing the sterilization and deodorization performance for an evaporator to improve an air purification effect in a passenger compartment.

According to one aspect of the present invention, there is provided a vehicular air conditioning system, including: an air-conditioning case having a plurality of passages divided by a partition wall; and an ion generator configured to emit anions and cations into the passages, wherein the ion generator includes a plurality of discharge electrodes installed to extend into the passages of the air-conditioning case and configured to emit anions and cations into the passages, and the partition wall of the air-conditioning case includes a communication portion configured to bring the passages into communication with each other so that the discharge electrodes installed in the passages face each other in the same space.

In the system, the passages of the air-conditioning case may include a first passage and a second passage, the discharge electrodes may include one anion discharge electrode extending into one of the first passage and the second passage of the air-conditioning case and one cation discharge electrode extending into the other of the first passage and the second passage, and the communication portion of the partition wall may be configured to bring the first passage and the second passage into communication with each other so that the anion discharge electrode and the cation discharge electrode in the first passage and the second passage face each other in the same space.

In the system, the discharge electrodes may include a plurality of anion discharge electrodes installed to extend into the passages of the air-conditioning case and configured to emit anions into the passages, and a cation discharge electrode installed between the anion discharge electrodes to extend into the passages of the air-conditioning case and configured to emit cations, and the communication portion of the partition wall may be configured to bring the passages into communication with each other with the cation discharge electrode interposed between the passages so that the anion discharge electrodes installed in the passages face the cation discharge electrode in the same space.

In the system, the passages may include a first passage and a second passage divided by the partition wall, the discharge electrodes may include a first anion discharge electrode and a second anion discharge electrode installed to extend into the first passage and the second passage, respectively, and a single cation discharge electrode installed between the first anion discharge electrode and the second anion discharge electrode to extend into the first passage and the second passage, and the communication portion of the partition wall may be configured to bring the first passage and the second passage into communication with each other with the cation discharge electrode interposed between the first passage and the second passage so that the first anion discharge electrode and the second anion discharge electrode installed in the first passage and the second passage face the cation discharge electrode in the same space.

With the vehicular air conditioning system according to the present invention, the anion discharge electrodes are installed on both sides of the cation discharge electrode interposed therebetween. The anion discharge electrodes are arranged in the first passage and the second passage of the air-conditioning case, respectively. Therefore, it is possible to uniformly generate anions in the first passage and the second passage.

Since the anions can be uniformly generated in the first passage and the second passage, the regions of the evaporator corresponding to the first passage and the second passage can be uniformly sterilized and deodorized without deviation. This makes it possible to improve the air purification effect in the passenger compartment.

In addition, the communication portion is formed in the partition wall between the first passage and the second passage of the air-conditioning case. The central cation discharge electrode and the lateral first and second anion discharge electrodes are configured to electrically interact with each other through the communication portion. Therefore, it is possible to significantly increase the amount of anions generated in the first and second anion discharge electrodes. This makes it possible to supply a larger amount of anions to the first and second passages corresponding to the first and second anion discharge electrodes.

Since the large amount of anions can be supplied to the first and second passages of the air-conditioning case, it is possible to supply a large amount of anions to the evaporator regions corresponding to the first and second passages. This makes it possible to enhance the sterilization and deodorization performance for the evaporator, thereby improving the air purification effect in the passenger compartment.

DETAILED DESCRIPTION

Preferred embodiments of a vehicular air conditioning system according to the present invention will now be described in detail with reference to the accompanying drawings (The same components as those described in the section of Background Art will be designated by like reference numerals).

First Embodiment

Prior to describing features of a vehicular air conditioning system according to the present invention, a vehicular air conditioning system having a two-layer temperature control structure will be briefly described with reference to FIG. 3.

In the vehicular air conditioning system having a two-layer temperature control structure, a partition wall 12 is installed inside an air-conditioning case 10 to divide the inside of the air-conditioning case 10 into an upper first passage 14 and a lower second passage 16.

Temperature doors 20 and 30 are installed in the first passage 14 and the second passage 16, respectively. Then, the temperature doors 20 and 30 are individually controlled to individually control the flow rates of cold air and hot air flowing through the first passage 14 and the second passage 16.

At this time, the flow-rate-controlled cold or hot air in the first passage 14 is supplied to the upper part of a passenger compartment, and the flow-rate-controlled cold or hot air in the second passage 16 is supplied to the lower part of the passenger compartment. Therefore, the upper and lower parts in the passenger compartment are independently cooled and heated.

Meanwhile, the upper first passage 14 is connected to an outdoor air introduction port 14a and is configured to mainly introduce an outdoor air, and the lower second passage 16 is connected to an indoor air introduction port 14b and is configured to mainly introduce an indoor air. In this case, the flow rate of the outdoor air introduced into the first passage 14 is larger than the flow rate of the indoor air introduced into the second passage 16.

Next, the features of the vehicular air conditioning system according to the present invention will be described in detail with reference to FIGS. 3 to 6.

Figure 3:
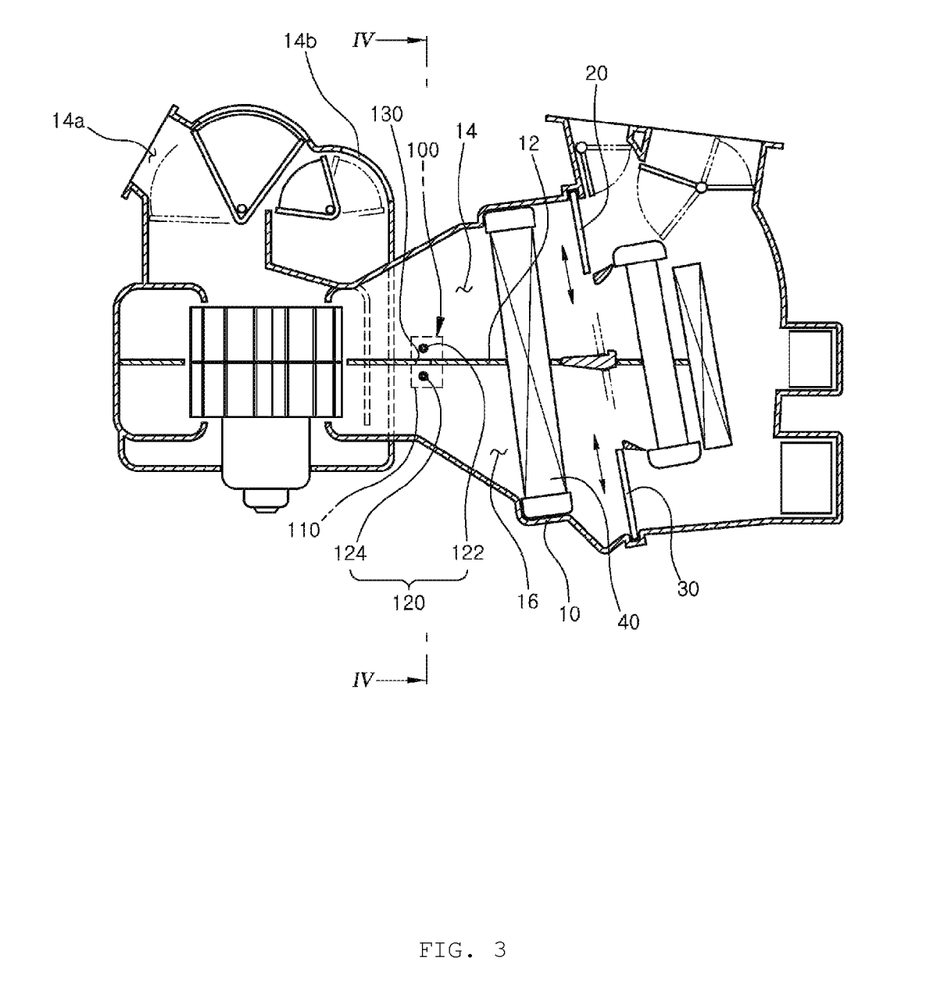
FIG. 3 is a view showing a vehicular air conditioning system according to a first embodiment of the present invention.

Referring first to FIG. 3, the vehicular air conditioning system of the present invention further includes an ion generator 100 installed on the upstream side of an evaporator 40.

The ion generator 100 includes a main body 110 and an ion generation part 120 installed on the main body 110.

Figure 4:
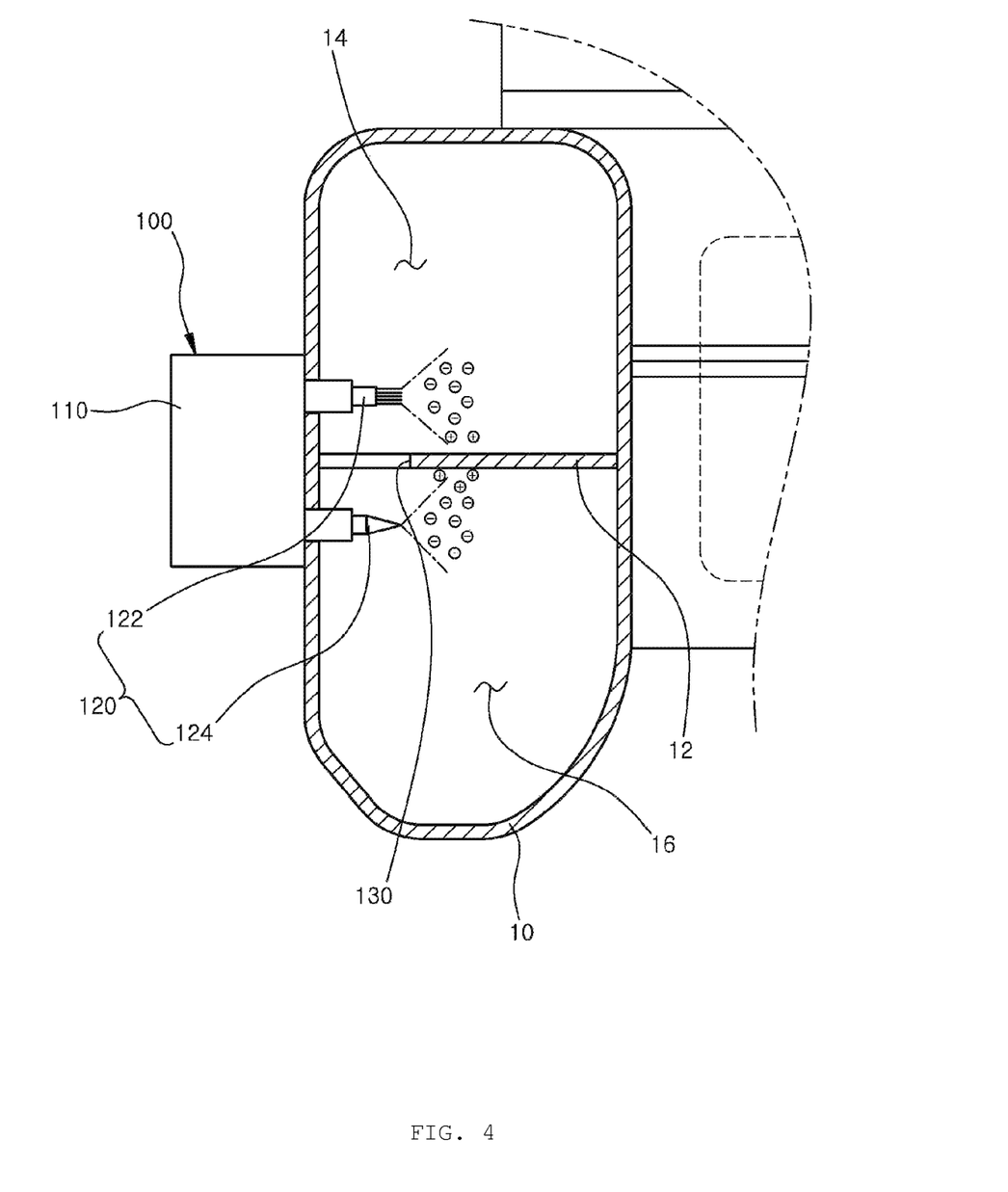
FIG. 4 is a sectional view taken along line IV-IV in FIG. 3, which is a detailed view of the vehicular air conditioning system according to the first embodiment of the present invention.
Figure 5:
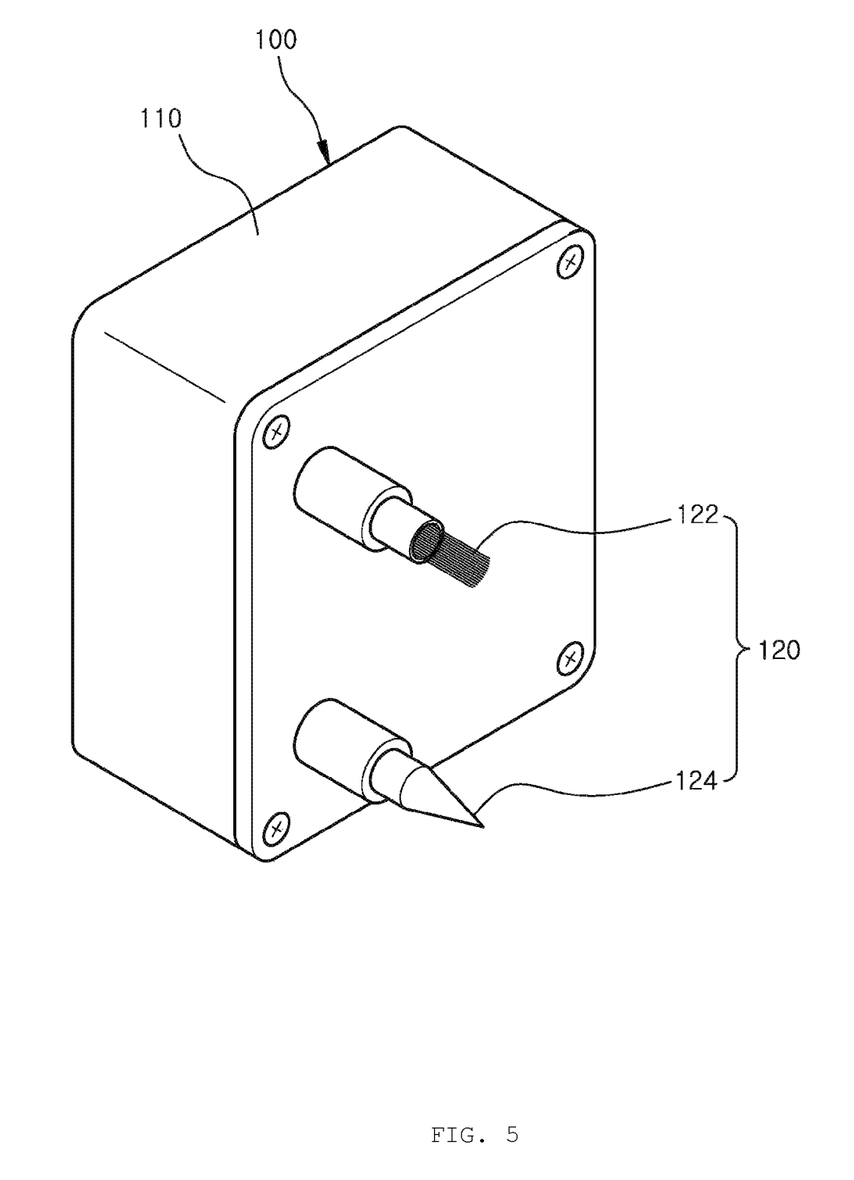
FIG. 5 is a perspective view of an ion generator constituting the vehicular air conditioning system according to the first embodiment of the present invention.

As shown in FIGS. 4 and 5, the main body 110 is installed on the outer surface of the air-conditioning case 10, and is configured to accommodate a power input part (not shown) and a high-voltage generation part (not shown).

The ion generation part 120 includes a plurality of discharge electrodes 122 and 124 extending side by side from the main body 110 toward the inside of the air-conditioning case 10.

In particular, the discharge electrodes 122 and 124 include one anion discharge electrode 122 and one cation discharge electrode 124. The anion discharge electrode 122 extends toward one of the first passage 14 and the second passage 16 of the air-conditioning case 10, and the cation discharge electrode 124 extends toward the other of the first passage 14 and the second passage 16. For example, the anion discharge electrode 122 extends toward the first passage 14 of the air-conditioning case 10, and the cation discharge electrode 124 extends toward the second passage 16 of the air-conditioning case 10.

The anion and cation discharge electrodes 122 and 124 emit high voltage pulses directly to the first passage 14 and the second passage 16, respectively, to generate anions and cations, respectively.

Therefore, the generated anions and cations are introduced toward the evaporator 40 to sterilize bacteria and fungi inhabiting on the surface of the evaporator 40 and to deodorize odors. This enhances the cleanliness of the air supplied into the passenger compartment.

Meanwhile, a communication portion 130 is formed on the partition wall 12 of the air-conditioning case 10 between the anion discharge electrode 122 and the cation discharge electrode 124 of the ion generator 100.

Figure 6:
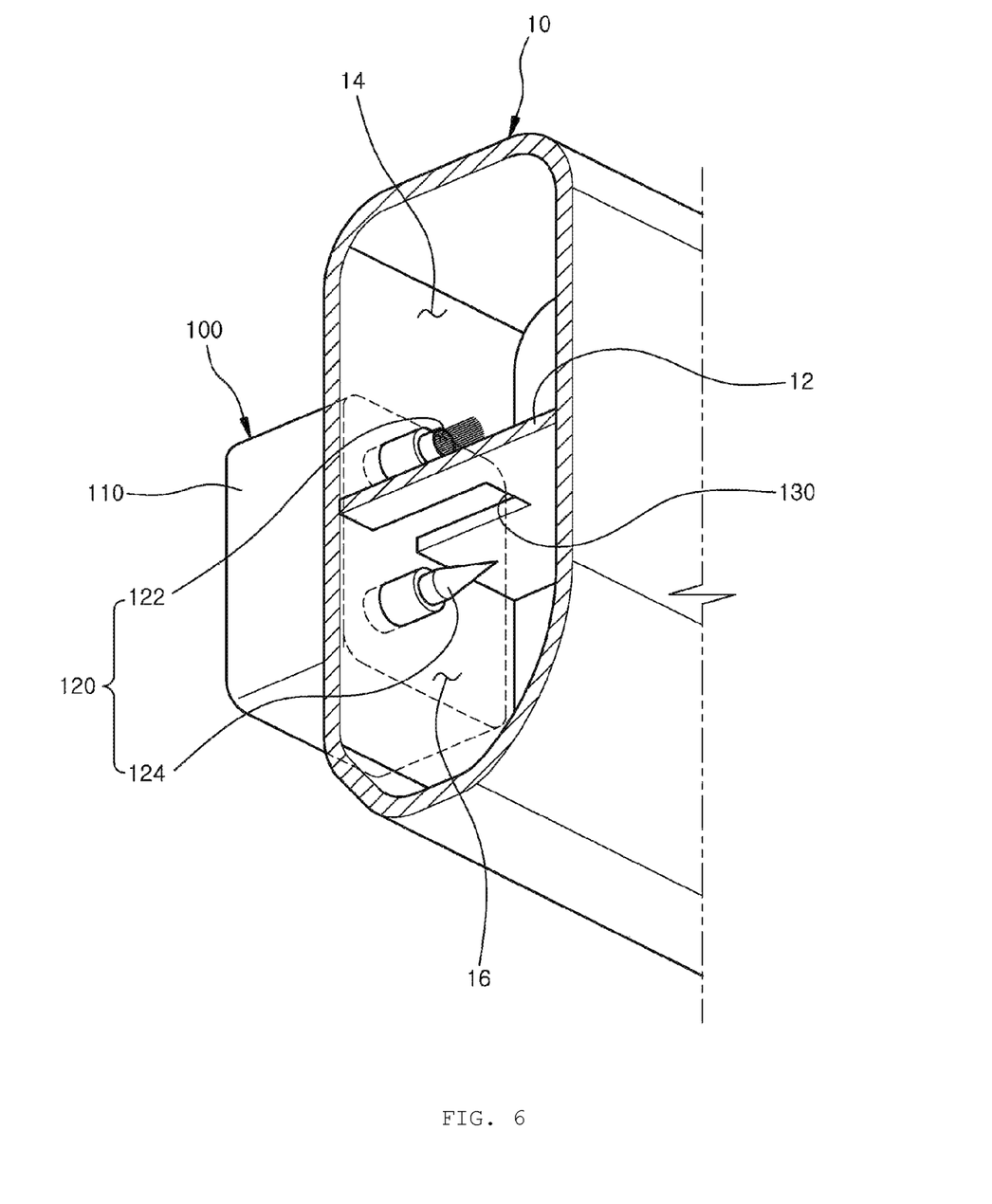
FIG. 6 is a perspective view showing a state in which the ion generator constituting the vehicular air conditioning system according to the first embodiment of the present invention is installed in an air-conditioning case.

The communication portion 130 is formed by cutting the partition wall 12. As shown in FIGS. 4 and 6, the communication portion 130 brings the first passage 14 and the second passage 16 of the air-conditioning case 10 into communication with each other so that the anion discharge electrode 122 and the cation discharge electrode 124 can face each other in the same space.

Since the communication part 130 ensures that the anion discharge electrode 122 and the cation discharge electrode 124 face each other in the same space, the high voltage pulses emitted from the anion discharge electrode 122 and the high voltage pulses emitted from the cation discharge electrode 124 can make electrical interaction.

Thus, the amount of anions and cations generated in the anion discharge electrode 122 and cation discharge electrode 124 is significantly increased, whereby a large amount of anions can be supplied to the region of the evaporator 40 on the downstream side. As a result, the sterilization and deodorization performance for the evaporator 40 can be enhanced to improve the air purification efficiency in the passenger compartment.

The anion discharge electrode 122 is disposed in the first passage 14 into which a large amount of outdoor air is introduced. Therefore, the anion discharge electrode 122 emits a larger amount of anions than the cation discharge electrode 124 disposed in the second passage 16 into which a relatively small amount of outdoor air is introduced.

According to the test results shown in Table 1 below, it can be noted that when the anion discharge electrode 122 is disposed in the first passage 14 for the outdoor air and the cation discharge electrode 124 is disposed in the second passage 16 for the indoor air, the number of anions generated in the anion discharge electrode 122 was 127,645, and the number of cations generated in the cation discharge electrode 124 was 56,841.

Accordingly, when the anion discharge electrode 122 is disposed in the first passage 14 for the outdoor air and the cation discharge electrode 124 is disposed in the second passage 16 for the indoor air, a relatively large amount of anions is generated. In particular, it can be seen that the anions are generated 2.25 times more than cations.

Conversely, when the anion discharge electrode 122 is disposed in the second passage 16 for the indoor air and the cation discharge electrode 124 is disposed in the first passage 14 for the outdoor air, the number of anions generated in the anion discharge electrode 122 was 68,104, and the number of cations generated in the cation discharge electrode 124 was 113,425.

Accordingly, when the anion discharge electrode 122 is disposed in the second passage 16 for the indoor air and the cation discharge electrode 124 is disposed in the first passage 14 for the outdoor air, a relatively small amount of anions is generated. In particular, it can be seen that the anions are generated 0.60 times less than cations.

As a result, the structure in which the anion discharge electrode 122 is disposed in the first passage 14 for the outdoor air and the cation discharge electrode 124 is disposed in the second passage 16 for the indoor air is a structure capable of maximizing the amount of anions, which are harmless to the human body and are excellent in bactericidal ability, while minimizing the generation of cations harmful to the human body.

TABLE 1

Classification
Arrangement of anion discharge electrode and cation discharge electrode in first passage (for outdoor air) and second passage (for indoor air)
Structure

| | Anion discharge electrode arranged in first passage, and cation discharge electrode arranged in second passage | | | Anion discharge electrode arranged in second passage, and cation discharge electrode arranged in first passage | | |
|---|---|---|---|---|---|---|
| | Anion | Cation | Ratio | Anion | Cation | Ratio |
| Ion number | 127,645 | 56,841 | 2.25 | 68,104 | 113,425 | 0.60 |

Meanwhile, it is preferable that the communication portion 130 of the partition wall 12 of the air-conditioning case 10 has at least the same size as the contour size of the anion and cation discharge electrodes 122 and 124. Preferably, the communication portion 130 of the partition wall 12 of the air-conditioning case 10 has the same size as the contour size of the anion and cation discharge electrodes 122 and 124. In particular, it is preferable that the height and width of the communication portion 130 are the same as the height and width of the anion and cation discharge electrodes 122 and 124.

This is to allow electrical interaction between the high voltage pulses emitted from the anion discharge electrode 122 and the cation discharge electrode 124, while minimizing the leakage and mixing of the outdoor air and the indoor air between the first passage 14 and the second passage 16.

In addition, it is preferable that the anion discharge electrode 122 is a brush type having a large number of ion-emitting tip portions, and the cation discharge electrode 124 is a needle type having one ion-emitting tip portion.

The reason for adopting this configuration is to minimize the generation of cations harmful to the human body by forming the cation discharge electrode 124 into the needle type, and to maximize the generation of anions, which are harmless to the human body and excellent in germicidal ability, by forming the anion discharge electrode 122 into the brush type.

Second Embodiment

Next, a vehicular air conditioning system according to a second embodiment of the present invention will be described with reference to FIGS. 7 to 10.

Figure 7:
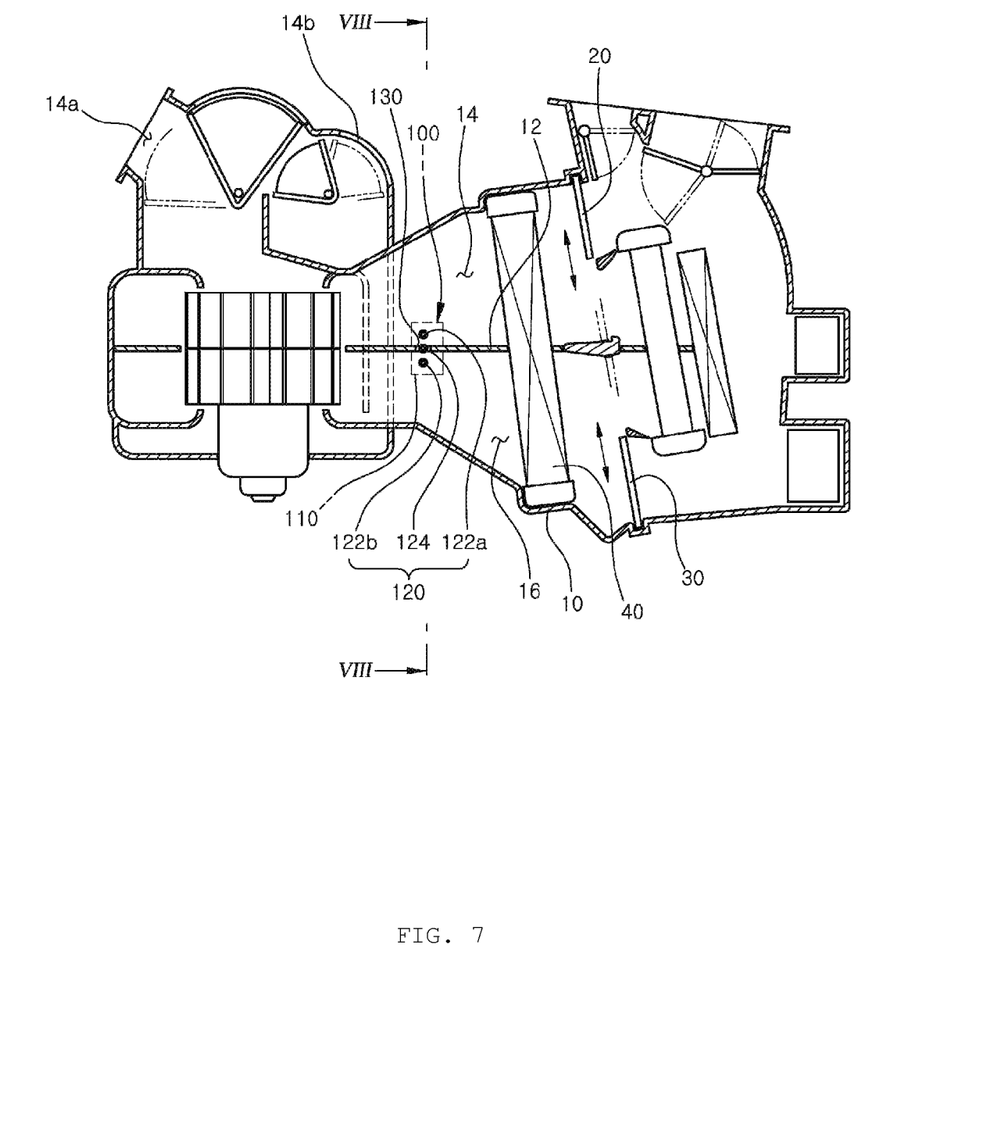
FIG. 7 is a view showing a vehicular air conditioning system according to a second embodiment of the present invention.
Figure 8:
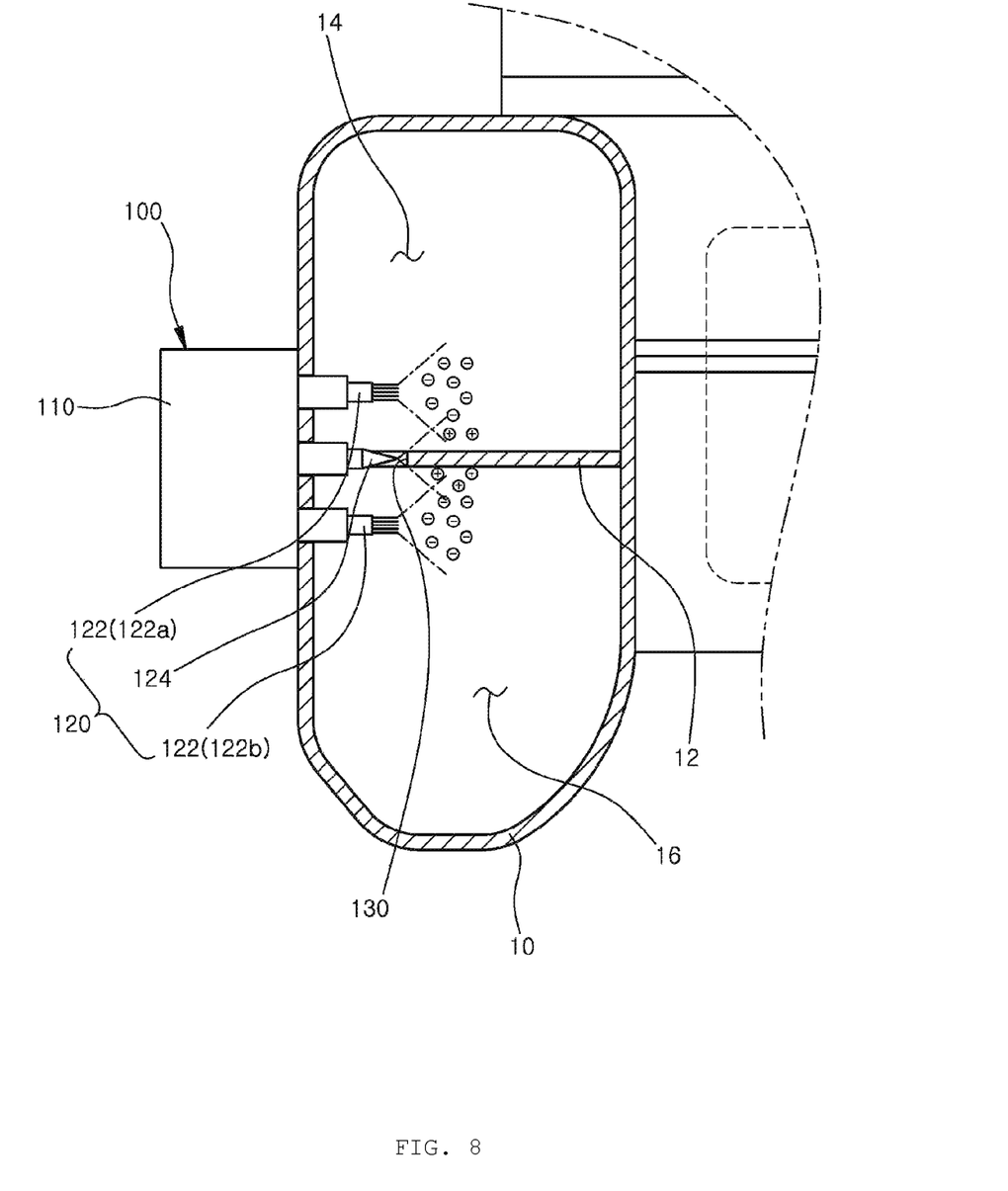
FIG. 8 is a sectional view taken along line VIII-VIII in FIG. 7, which is a view showing the vehicular air conditioning system according to the second embodiment of the present invention in detail.
Figure 9:
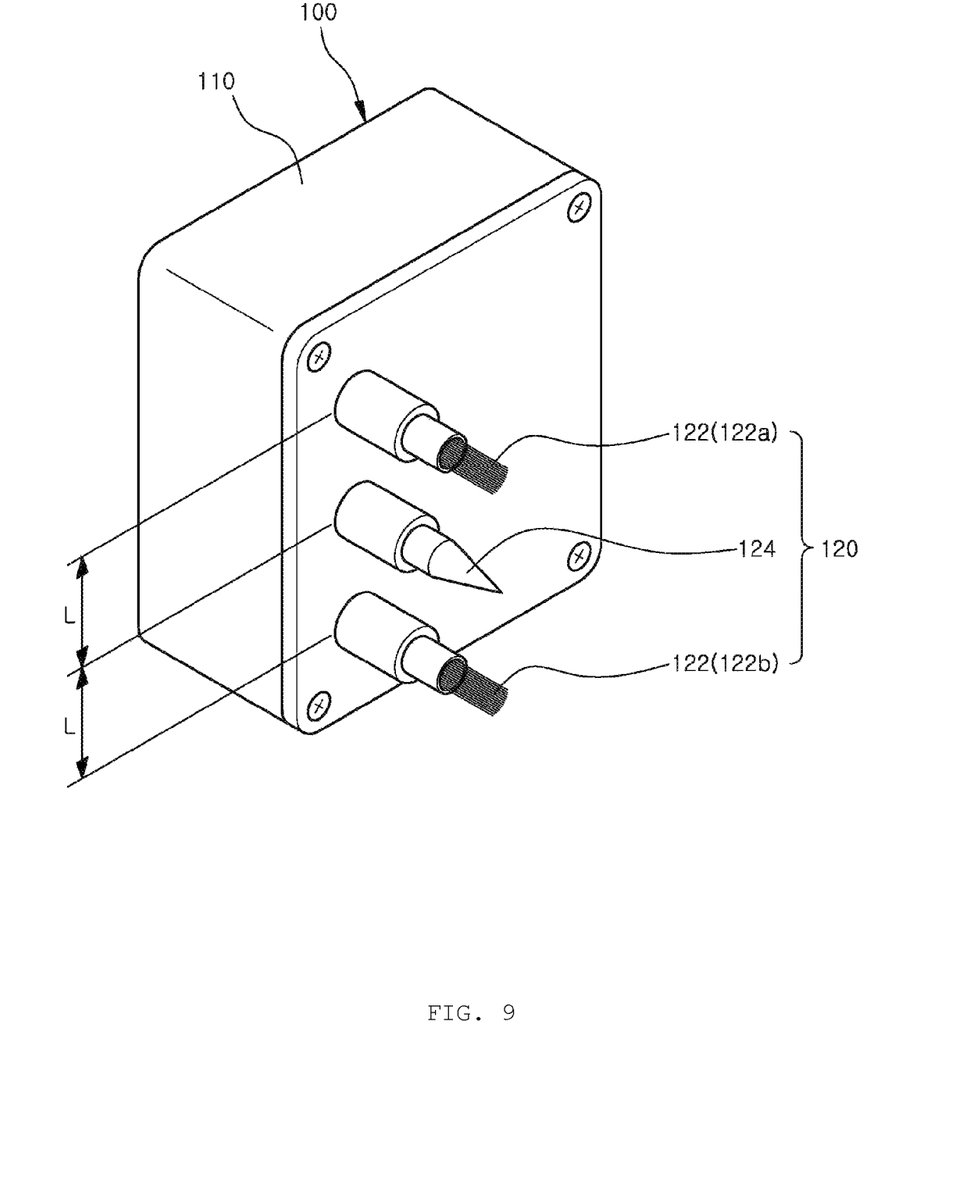
FIG. 9 is a perspective view of an ion generator constituting the vehicular air conditioning system according to the second embodiment of the present invention.

Referring first to FIGS. 7 to 9, the vehicular air conditioning system of the second embodiment includes an ion generator 100 having an ion generation part 120, wherein the ion generation part 120 includes a plurality of discharge electrodes 122 and 124 extending toward the inside of the air-conditioning case 10.

In particular, the discharge electrodes 122 and 124 include one cation discharge electrode 124 and two anion discharge electrodes 122, wherein the cation discharge electrode 124 is arranged at the center, and the two anion discharge electrodes 122 are arranged in a spaced-apart relationship on the upper and lower sides with the cation discharge electrode 124 interposed therebetween.

The two anion discharge electrodes 122 are installed on a straight line with the cation discharge electrode 124 interposed therebetween. The anion discharge electrodes 122 thus installed are spaced apart by equal intervals L with respect to the cation discharge electrode 124.

Figure 10:
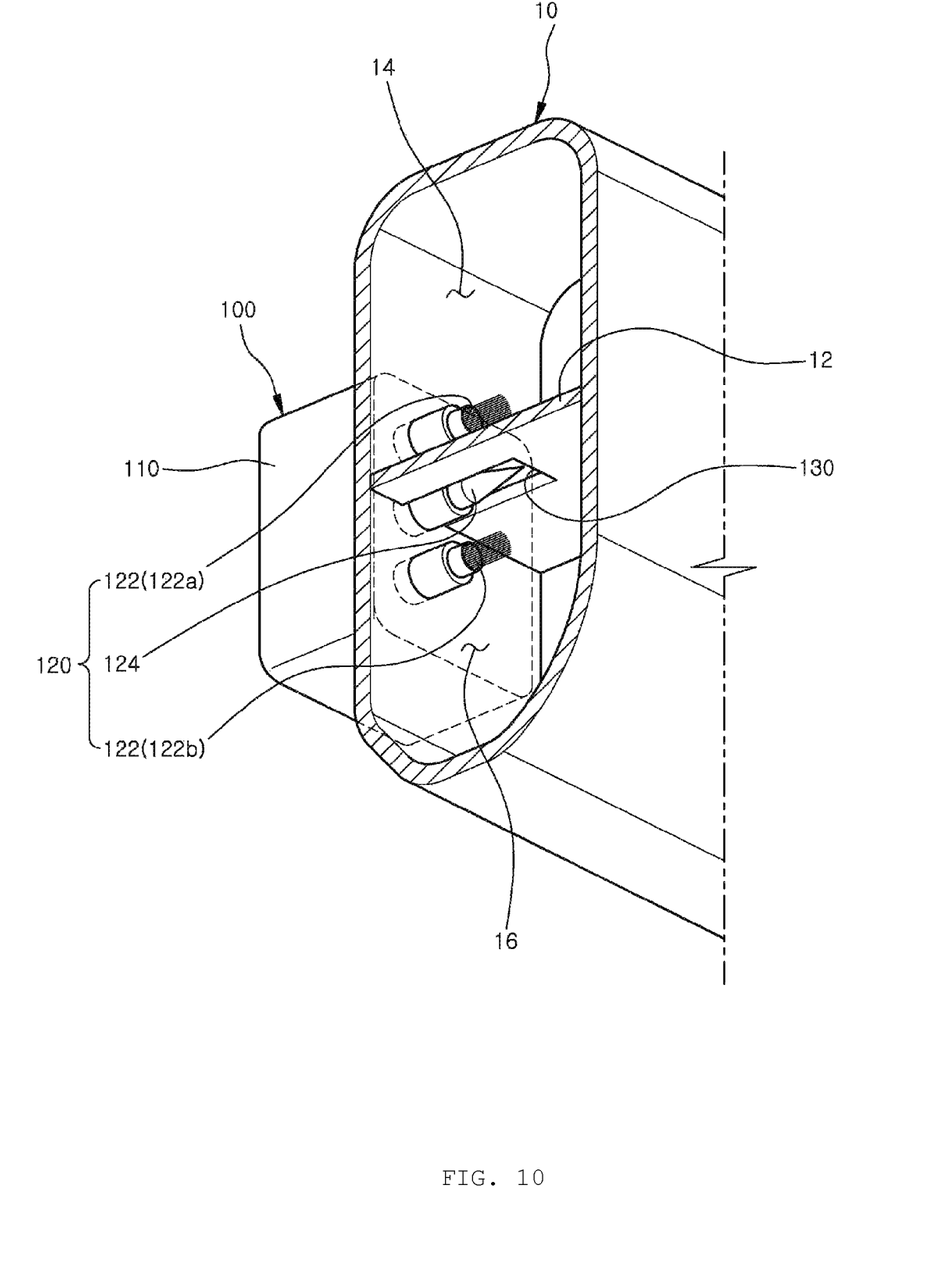
FIG. 10 is a perspective view showing a state in which the ion generator constituting the vehicular air conditioning system according to the second embodiment of the present invention is installed in an air-conditioning case.

The discharge electrodes 122 and 124 pass through the air-conditioning case 10 and extend into the air-conditioning case 10 in a process of installing the main body 110 on the outer surface of the air-conditioning case 10.

Specifically, the central cation discharge electrode 124 extends toward a position corresponding to the partition wall 12 that divides the interior of the air-conditioning case 10. The upper anion discharge electrode 122 (hereinafter referred to as "first anion discharge electrode 122a") extends toward the inside of the upper first passage of the air-conditioning case 10. The anion discharge electrode 122 (hereinafter referred to as "second anion discharge electrode 122b") extends toward the inside of the lower second passage 16 of the air-conditioning case 10.

Meanwhile, the partition wall 12 of the air-conditioning case 10 corresponding to the cation discharge electrode 124 of the ion generator 100 has a communication portion 130 capable of accommodating the cation discharge electrode 124. The communication portion 130 keeps both the upper and lower sides of the cation discharge electrode 124 opened toward the first and second passages 14 and 16.

Therefore, the cation discharge electrode 124 may face the first anion discharge electrode 122a in the first passage 14 and the second anion discharge electrode 122b in the second passage 16 in the same space.

In some cases, the cation discharge electrode 124 of the ion generator 100 may not be accommodated in the communication portion 130 of the partition wall 12, but may be installed to extend toward either one of the first and second passages 14 and 16.

Even in such a case, the communication portion 130 of the partition wall 12 is formed to correspond to the cation discharge electrode 124, so that both lateral portions of the cation discharge electrode 124 are exposed in the same space to face the first anion discharge electrode 122a in the first passage 14 and the second anion discharge electrode 122b in the second passage 16.

In the case where the cation discharge electrode 124 is not accommodated in the communication portion 130 of the partition wall 12 but is configured to extend toward either one of the first and second passages 14 and 16, it is preferable that the cation discharge electrode 124 extends toward the first passage 14 into which the outdoor air is mainly introduced.

In this case, the cations generated in the cation discharge electrode 124 are guided toward the second passage 16 through the communication portion 130 of the partition wall 12.

According to this structure, the cation discharge electrode 124 of the ion generator 100 is accommodated in the communication portion 130 of the partition wall 12, and the first and second anion discharge electrodes 122a and 122b are arranged in the first passage 14 and the second passage 16 of the air-conditioning case 10 so as to face the cation discharge electrode 124. When electricity is applied in this state, the cation discharge electrode 124 and the first and second anion discharge electrodes 122a and 122b generate anions and cations while emitting high voltage pulses.

In particular, the first anion discharge electrode 122a arranged in the first passage 14 and the cation discharge electrode 124 accommodated in the communication portion 130 of the partition wall 12 generate a large amount of anions and cations in the first passage 14 while emitting high voltage pulses into the first passage 14.

In addition, the second anion discharge electrode 122b arranged in the second passage 16 and the cation discharge electrode 124 accommodated in the communication portion 130 of the partition wall 12 generate a large amount of anions and cations in the second passage 16 while emitting high voltage pulses into the second passage 16.

In this way, a large amount of anions and a large amount of cations are supplied into the first passage 14 and the second passage 16. In particular, the anions and the cations are uniformly supplied into the first passage 14 and the second passage 16 without deviation.

Therefore, it is possible to uniformly disinfect and deodorize the regions of the evaporator 40 corresponding to the first passage 14 and the second passage 16 without deviation. As a result, it is possible to improve the air purification performance in the passenger compartment.

In addition, the first and second anion discharge electrodes 122a and 122b arranged in the first passage 14 and the second passage 16, respectively, are configured to face the cation discharge electrode 124 through the communication portion 130 of the partition wall 12 in the same space. Therefore, it is possible to enable electrical interaction between the high voltage pulses emitted from the first and second anion discharge electrodes 122a and 122b and the high voltage pulses emitted from the cation discharge electrode 124.

Therefore, the amount of anions and cations generated in the anion discharge electrodes 122 and the cation discharge electrode 124 is significantly increased, whereby a large amount of anions can be supplied to the region of the evaporator 40 on the downstream side. As a result, the sterilization and deodorization performance for the evaporator 40 can be enhanced to improve the air purification efficiency in the passenger compartment.

Since the first anion discharge electrode 122a is disposed in the first passage 14 into which a large amount of outdoor air is introduced, the first anion discharge electrode 122a emits a relatively large amount of anions as compared with the second anion discharge electrode 122b arranged in the second passage 16 into which the indoor air is introduced at a smaller flow rate than the flow rate of the outdoor air introduced into the first passage 14.

Meanwhile, referring to FIGS. 8 to 10, the first and second anion discharge electrodes 122a and 122b of the ion generator 100 are arranged in a spaced-apart relationship on the upper and lower sides with the cation discharge electrode 124 interposed therebetween. It is preferable that the first and second anion discharge electrodes 122a and 122b are arranged at an equal interval L with respect to the cation discharge electrode 124.

It is preferable that the first and second anion discharge electrodes 122a and 122b are arranged at an equal interval, preferably at an interval L of 12 to 17 mm, with respect to the cation discharge electrode 124.

In addition, it is preferable that the communication portion 130 of the partition wall 12 of the air-conditioning case 10 for accommodating the central cation discharge electrode 124 has at least the same size as the contour size of the cation discharge electrode 124.

Preferably, the communication portion 130 of the partition wall 12 of the air-conditioning case 10 has the same size as the contour size of the cation discharge electrode 124. In particular, it is preferable that the height and width of the communication portion 130 are the same as the height and width of the cation discharge electrode 124.

This is to allow electrical interaction between the high voltage pulses emitted from the first and second anion discharge electrodes 122a and 122b and the cation discharge electrode 124, while minimizing the leakage and mixing of the outdoor air and the indoor air between the first passage 14 accommodating the first anion discharge electrode 122a and the second passage 16 accommodating the second anion discharge electrode 122b.

In addition, it is preferable that the central cation discharge electrode 124 is a needle type having one ion-emitting tip portion, and each of the first and second anion discharge electrodes 122a and 122b is a brush type having a large number of ion-emitting tip portions.

The reason for adopting this configuration is to minimize the generation of cations harmful to the human body by forming the cation discharge electrode 124 into the needle type, and to maximize the generation of anions, which are harmless to the human body and excellent in germicidal ability, by forming each of the first and second anion discharge electrodes 122a and 122b into the brush type.

In some cases, the central cation discharge electrode 124 may be a needle type, one of the first and second anion discharge electrodes 122a and 122b may be a brush type, and the other may be a needle type.

Preferably, the first anion discharge electrode 122a arranged in the first passage 14 may be a brush type, and the second anion discharge electrode 122b arranged in the second passage 16 may be a needle type.

This is to ensure that the brush-type first anion discharge electrode 122a in the first passage 14 into which a large amount of outside air is mainly introduced can generate a larger amount of anions.

In addition, the central cation discharge electrode 124 and the first and second anion discharge electrodes 122a and 122b may all be configured as a needle type.

With the vehicular air conditioning system according to the present invention, the structure of the ion generator 100 is improved such that the anion discharge electrodes 122 are installed on both sides of the cation discharge electrode 124 interposed therebetween. The anion discharge electrodes 122 are arranged in the first passage 14 and the second passage 16 of the air-conditioning case 10, respectively. Therefore, it is possible to uniformly generate anions in the first passage 14 and the second passage 16.

Since the anions can be uniformly generated in the first passage 14 and the second passage 16, the regions of the evaporator 40 corresponding to the first passage 14 and the second passage 16 can be uniformly sterilized and deodorized without deviation. This makes it possible to improve the air purification effect in the passenger compartment.

In addition, the communication portion 130 is formed in the partition wall 12 between the first passage 14 and the second passage 16 of the air-conditioning case 10. The central cation discharge electrode 124 and the lateral first and second anion discharge electrodes 122a and 122b are configured to electrically interact with each other through the communication portion 130. Therefore, it is possible to significantly increase the amount of anions generated in the first and second anion discharge electrodes 122a and 122b. This makes it possible to supply a larger amount of anions to the first and second passages 14 and 16 corresponding to the first and second anion discharge electrodes 122a and 122b.

Since the large amount of anions can be supplied to the first and second passages 14 and 16 of the air-conditioning case 10, it is possible to supply a large amount of anions to the regions of the evaporator 40 corresponding to the first and second passages 14 and 16. This makes it possible to enhance the sterilization and deodorization performance for the evaporator 40, thereby improving the air purification effect in the passenger compartment.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:
an air-conditioning case having a plurality of passages divided by a partition wall; and an ion generator configured to emit anions and cations into the passages, wherein the ion generator includes a plurality of discharge electrodes installed to extend into the passages of the air-conditioning case and configured to emit anions and cations into the passages, and
the partition wall of the air-conditioning case includes a communication portion configured to bring the passages into communication with each other so that the discharge electrodes installed in the passages face each other in the same space, and
wherein the passages of the air-conditioning case include a first passage and a second passage,
the discharge electrodes include one anion discharge electrode extending into the first passage of the air-conditioning case and one cation discharge electrode extending into the second passage, and
the communication portion of the partition wall is configured to bring the first passage and the second passage into communication with each other so that the anion discharge electrode and the cation discharge electrode in the first passage and the second passage face each other in the same space, and
wherein the first passage of the air-conditioning case is configured to mainly introduce outdoor air and formed above the second passage,
the second passage is configured to mainly introduce indoor air and formed below the first passage,
the anion discharge electrode of the ion generator is arranged in the first passage for mainly introducing the outdoor air, and
the cation discharge electrode is arranged in the second passage for mainly introducing the indoor air, and
wherein a flow rate of the outdoor air introduced into the first passage is larger than the flow rate of the indoor air introduced into the second passage, and
wherein the anion discharge electrode of the ion generator is a brush shape having a plurality of ion-emitting tip portions so as to maximize generation of anions which are harmless to a human body and having germicidal ability, and the cation discharge electrode is a needle shape having a single ion-emitting tip portion so as to minimize generation of cations which are harmful to the human body, and
wherein the anion discharge electrode is disposed in the first passage into which mainly outdoor air is introduced, the anion discharge electrode emits a relatively large amount of anion as compared to the cation discharge electrode arranged in the second passage into which the indoor air is introduced at a smaller flow rate than the flow rate of the outdoor air introduced into the first passage, and
wherein the communication portion comprises a through-hole formed by cutting the partition wall of the air-conditioning case, and the through hole has a same height and width as a height and width of each of the discharge electrodes.

2. A vehicular air conditioning system, comprising:
an air-conditioning case having a plurality of passages divided by a partition wall; and an ion generator configured to emit anions and cations into the passages, wherein the ion generator includes a plurality of discharge electrodes installed to extend into the passages of the air-conditioning case and configured to emit anions and cations into the passages, and the partition wall of the air-conditioning case includes a communication portion configured to bring the passages into communication with each other so that the discharge electrodes installed in the passages face each other in the same space, and
wherein the discharge electrodes include a plurality of anion discharge electrodes installed to extend into the passages of the air-conditioning case and configured to emit anions into the passages, and a single cation discharge electrode installed between the anion discharge electrodes to extend into the passages of the air-conditioning case and configured to emit cations, and the communication portion of the partition wall is configured to bring the passages into communication with each other with the cation discharge electrode interposed between the passages so that the anion discharge electrodes installed in the passages face the cation discharge electrode in the same space, and
wherein the partition wall is installed inside the air-conditioning case to divide the inside of the air-conditioning case into an upper first passage of the passages and a lower second passage of the passages, and a plurality of temperature doors are individually controlled to individually control the flow rates of cold air and hot air flowing through the first passage and the second passage, and
the plurality of anion discharge electrodes includes a first anion discharge electrode and a second anion discharge electrode installed to extend into the first passage and the second passage, respectively, and the single cation discharge electrode installed between the first anion discharge electrode and the second anion discharge electrode to extend into the first passage and the second passage, and
the communication portion of the partition wall is configured to bring the first passage and the second passage into communication with each other with the cation discharge electrode interposed between the first passage and the second passage so that the first anion discharge electrode and the second anion discharge electrode installed in the first passage and the second passage face the cation discharge electrode in the same space, and
wherein the first passage of the air-conditioning case is configured to mainly introduce outdoor air and formed above the second passage, the second passage is configured to mainly introduce indoor air and formed below the first passage, and the first anion discharge electrode in the first passage is configured to emit a larger amount of anions than the second anion discharge electrode in the second passage, and wherein the cation discharge electrode of the ion generator is installed to extend toward the partition wall between the first passage and the second passage, and the communication portion of the partition wall is formed at a position corresponding to the cation discharge electrode and configured to accommodate the cation discharge electrode, and wherein the communication portion is formed by cutting the partition wall of the air-conditioning case, and has a same height and width as a height and width of the cation discharge electrode, and wherein the anion discharge electrodes of the ion generator are installed on a straight line with the cation discharge electrode interposed therebetween and are installed at an equal interval with respect to the cation discharge electrode.

3. The system according to claim 2, wherein the cation discharge electrode of the ion generator is a needle shape having one ion-emitting tip portion, and each of the anion discharge electrodes is a brush shape having a plurality of ion-emitting tip portions.

4. The system according to claim 2, wherein the cation discharge electrode of the ion generator is a needle shape having one ion-emitting tip portion, one of the first anion discharge electrode and the second anion discharge electrode is a brush shape having a plurality of ion-emitting tip portions, and the other of the first anion discharge electrode and the second anion discharge electrode is a needle shape having one ion-emitting tip portion.

5. The system according to claim 4 wherein the first anion discharge electrode installed in the first passage for introducing the outdoor air is the brush shape, and the second anion discharge electrode in the second passage for introducing the indoor air is the needle shape.

* * * * *